Feb. 28, 1933.  W. C. OCKER  1,899,104
TRAINING PLANE
Filed July 18, 1931   2 Sheets-Sheet 1

INVENTOR
WILLIAM C. OCKER
BY Robert H. Young
ATTORNEY

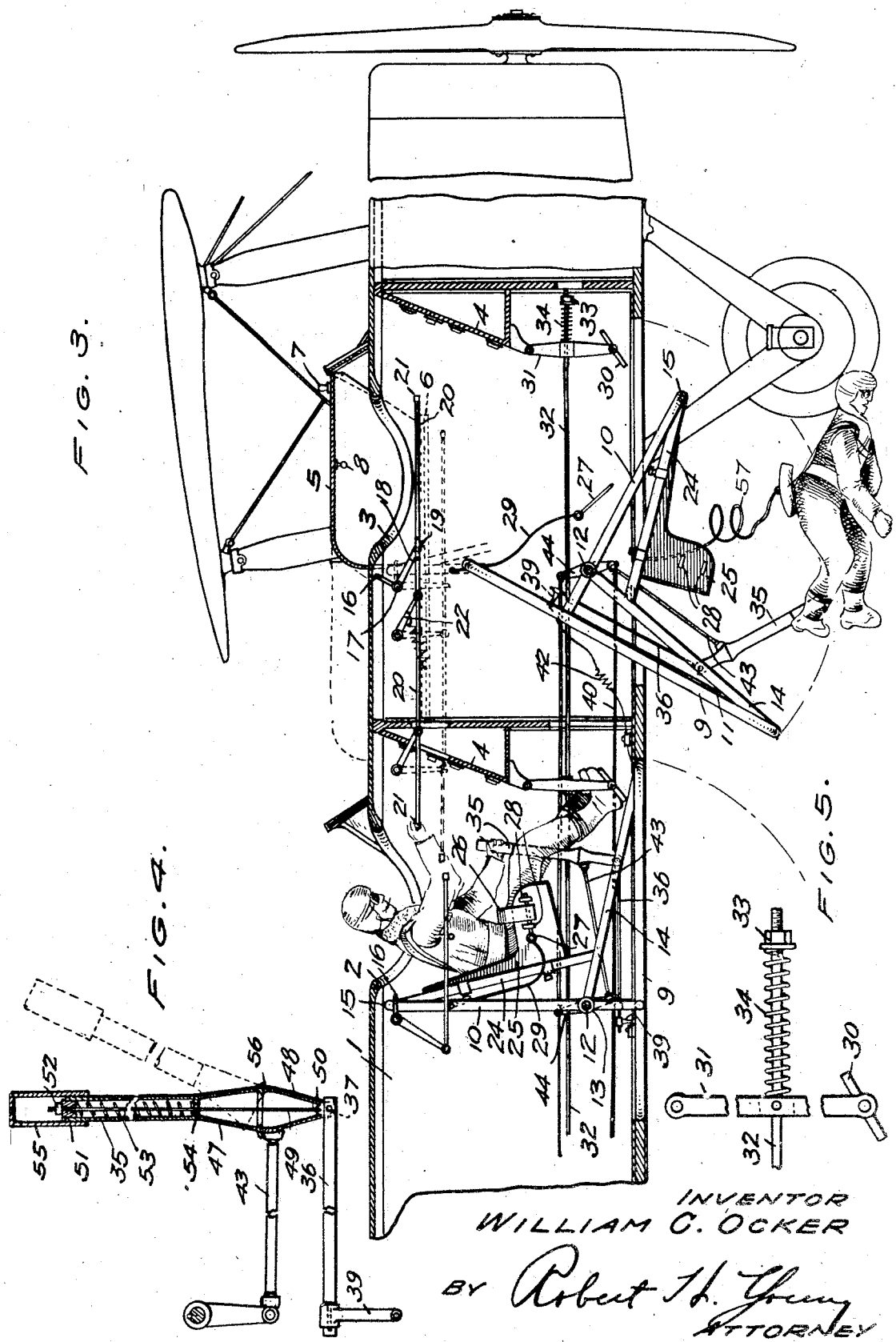

Patented Feb. 28, 1933

1,899,104

UNITED STATES PATENT OFFICE

WILLIAM C. OCKER, OF KELLY FIELD, TEXAS

TRAINING PLANE

Application filed July 18, 1931. Serial No. 551,607.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to improvements in airplanes of the training type and the objects of the improvements are, first, to provide a training airplane to be used for training pilots in blind flying by instruments as against instinct and, second, to enable such training to be carried out with the maximum safety to both student and instructor.

An additional object of the invention is to provide emergency-exit means and a novel arrangement of controls adapted to be used in all types of airplanes and with all types of aircraft.

With the above objects in view, the invention resides in the novel construction, arrangement, and combination of parts hereinafter more fully described and pointed out in the accompanying drawings, in which Figure 1 is a view, in perspective, of the framework and associated parts incorporating the various features of the invention;

Figure 2 is a detail, in perspective, of the seat assembly;

Figure 3 is a side elevation of a training plane embodying the invention;

Figure 4 is a detail view of the control stick with its connections to elevator and aileron controls;

Figure 5 is a detail view of one of the flexible pedals;

The drawings illustrate a training plane, the fuselage 1 of which is provided with two tandem cockpits 2 and 3 in each of which is an instrument board 4 for the placement thereon of a bank-and-turn indicator, inclinometer, and compass, together with such other instruments as are required. The rear cockpit 2 is occupied by the instructor or safety pilot and the front cockpit 3 by the student or subject pilot. A cover 5 is mounted between the cockpits for sliding movement in guides 6 on opposite sides of the fuselage and is adapted to be moved forward by the pilot in the front cockpit so as to completely cover the cockpit; the first part of the movement being accomplished by means of a handle 7 on top of the cover and the last part of the movement by handle means 8 on the underside of the cover. When enclosed in the covered cockpit, the student or subject-pilot has no outside visual reference and is compelled to rely, for flight purposes, upon the artificial horizon provided by his flight instruments.

Each cockpit is provided with a drop bottom for ejecting the pilot through the bottom of the fuselage in an emergency, such as when the plane is in a tailspin and rapidly losing altitude. In a spin, when a pilot endeavors to rise and jump over the side of the plane, he finds that he is literally "glued" in and it is only with considerable difficulty that he is able to free himself from the plane. It is as if the weight of the pilot increases by three or four times as much as the normal amount. By grasping the sides of the cockpit with his hands, a pilot may raise himself from the seat, get both feet up on the cowling, and then push himself over the right side of the fuselage. Too much altitude is lost between the time the pilot starts to leave the plane and the time he is free. Since the drop-bottom arrangement of both cockpits is the same, a description of one will suffice for both.

The drop-bottom structure comprises a framework including a horizontal base frame 9 and a perpendicular frame 10 integral with the base frame and extending from the top side thereof and at a point inwardly of the rear end of the latter, as illustrated. The base frame serves as the bottom of the cockpit and is provided with suitable flooring, as at 11. It pivots on a rod 12 extending through bearing 13 in the side member of frame 10, which frame is suitably braced on its forward side by the brace rods 14. The pivot rod 12 extends crosswise of the cockpit space and is suitably journaled in the fuselage of the plane. The sides of the frame 10 converge, above the pivot rod, to provide a narrow top portion 15 adapted to be embraced by the loop 16 of a releasable detent mechanism by means of which the framework is retained in its normal position.

The pilot's seat, as well as the controls for the ailerons and elevators, are carried by the framework and move downwardly with the framework when the latter is released.

The releasing mechanism for the drop-bottom framework of the forward cockpit comprises a rotatable shaft 17 carrying the loop 16 and journaled crosswise of the fuselage so that the loop 16 in its horizontal position, engages over the top 15 of the seat frame 10. Fixed to the shaft 17, adjacent one end thereof, is a depending arm 18 loosely encircled at its lower end by the loop 19 of the push rod 20. The loop 19 is centered approximately between the ends of the push rods which is bent at the extremities to provide handles 21. The push-rod is pivotally supported by the swinging arms 22 pivoted to the fuselage and when the rod is moved forward by either pilot it will rotate the shaft 17 so as to disengage the loop 16 from the frame 10 permitting the latter to fall forward. The drop-frame of the rear cockpit is released by a separate mechanism substantially the duplicate of the front release mechanism, being merely modified to the extent that it is operated only by the instructor pilot. By means of this arrangement, the pilot in the enclosed cockpit may release himself or be released by the instructor pilot in an emergency.

Connecting the brace rods 14 in the vicinity of the pivot rod 12 is a bridge bar 23 supporting a pair of struts 24 spaced apart the minimum width of the upright frame 10 and connected at their upper extremities to the top bar 15 of the said frame. Mounted on the struts 24, so as to be adjustable as to height, is the pilot's seat 25, shown in detail in Fig. 2. Associated with the seat is a safety belt or strap 26 with a loop at each end through which passes a pin 27. Pins 27 are inserted in apertures in lugs 28 attached to the arms of the seat. The after end of each pin is attached loosely by a chain, string or wire 29 to the fixed after end of the cockpit. When the framework falls forward, rotating on the hinge or pivot rod 12, the pins 27 because they are attached to the fixed after end of the cockpit are automatically withdrawn from the lugs 28 and release both ends of the strap 26. This arrangement provides efficient means of releasing the belts, straps, or other fastenings holding the pilot to the seat of the cockpit, which operates automatically and coincidentally with the opening of the bottom of the cockpit.

The two foot pedals of the rudder controls are suspended from the underside of the instrument board, as shown in Fig. 1. Each pedal comprises a tread plate 30 rockably supported between the lower extremities of two pedal-arms 31 pivotally connected at their upper extremities to the said instrument board for swinging movement in a fore and aft direction. One arm of each pedal is connected with a rudder control rod 32. Both rudder control rods 32 are fixedly connected to the control pedals of the after cockpit 2 but have flexible connection with the actuating arm of the control pedals in cockpit 3. To provide for this flexible connection, the rudder control rod is slidable through its actuating arm and has an adjusting nut 33 on its forward end as shown in Fig. 5. Encircling the rod between the nut and the adjacent side of the actuating arm is a spring 34. After the maximum pressure required for pedal control has been determined, the spring tension is adjusted by the nut 33 to a point where the spring will contract when this necessary tension has been reached. This arrangement is advantageous in that it provides for breaking a "frozen control" to the pedals.

The control stick 35 for operating the elevator and aileron controls is pivotally connected to a shaft 36 by means of a fork or yoke 37 so that while the position of the shaft is not changed by any swinging movement of the stick in a fore and aft direction, any crosswise movement of the stick will effect a corresponding rotation of the shaft about its axis. The shaft 36 is journaled in bearings in the cross-braces 37' and 38 of the framework and depending from its after end is an arm 39 to which are connected the aileron control cables 40 and 41. The aileron controls of the front cockpit are so arranged that when the framework drops, as in Fig. 3, they slacken and become inoperative, but do not interfere with the controls from the other cockpit. A suitably tensioned spring 42 may be incorporated in each of the aileron control cables to facilitate this action. The control stick is also connected, by means of a connecting rod 43, to the pivot rod 12 on the outer ends of which are the cross arms 44 to which are connected the elevator control cables 45 and 46. The connecting rod 43 has swivel joint connections with both the control stick and the pivot rod allowing necessary movement of the rod when the stick is moved sidewise. Although the elevator control cables of the front cockpit are connected with the crossarms on the pivot rod in the after cockpit, the connections of the elevator controls from the front control stick are so arranged that when the framework drops, the control stick thereof is pushed forward as far as possible but does not interfere with the continued operation of the elevator control from the other cockpit.

The control stick of the front cockpit differs from the control stick of the after cockpit in that it is so designed as to become inoperative after a predetermined force has been applied to it in any direction by the pilot using it, thus preventing "freezing" of the controls. The construction of the flexible control stick is shown in Fig. 4. The bottom portion of this stick consists of two hollow cones 47 and 48 with open bases adjacent, the periphery of the base of the upper cone 47 having a groove in which fits the periphery of the base of the lower cone 48. Centered within the cones is a rod 49, the lower end of which has a loose hinge connection 50 with the lower cone. The rod extends into the upper cone 47 and carries at its upper end a slidably mounted spring follower 51 held in place by an adjusting nut 52. Bearing against the underside of the spring follower is a tensioning spring 53 which seats or rests at the bottom end upon a ledge or shoulder 54 of the upper cone. An elongated cap 55 is threadedly engaged with the upper position of the top cone 47 and serves as a convenient handle for the stick. The two cones are held together by the tension on the spring and yet are capable of bending under pressure at the joint which forms a circular hinge 56. When sufficient pressure is applied horizontally to the top of the stick to overcome the tension of the spring, the stick will bend at the joint so that the upper cone swings on the lower cone as indicated in dotted lines in Fig. 4. The pressure required to cause this hinging motion may be regulated by varying the tension on the spring 53 by adjustment of the nut 52. Detaching the handle 55, by unscrewing it, gives access to the adjusting nut.

According to the table of pressures required for controlling a typical machine, a horizontal pressure of about 18 lbs. should be the point at which the stick would begin to bend and compress the spring. As soon as the stick begins to bend, the rod 49 moves against the resistance of the spring to a position closer to the hinge joint 56, thus decreasing the moment of resistance which means that much less than 18 lbs. pressure will be required on the part of a pilot resisting a "frozen stick". When the "frozen stick" is released, it will assume a vertical position and will not again bend until a horizontal force exceeding 18 lbs. is applied to it.

In addition to their importance in providing means for breaking "frozen" controls the flexible connections of the pedals and control stick facilitate the dropping of the pilot from the forward cockpit inasmuch as they will yield when any binding pressure is put upon them. The rip-cord of the pilot's parachute may be attached to some portion of the fuselage by a wire, chain, or cord 57 of a predetermined length so that it will be pulled automatically when the pilot has fallen from the plane a distance equal to the predetermined length of the wire, chain or cord. By means of this arrangement, the opening of the parachute does not occur until the pilot has fallen so far that it is unlikely his parachute will become entangled with the plane.

From the foregoing it will be seen that the invention provides a training plane in which flight training, particularly in a hooded cockpit, can be carried on with the maximum degree of safety to both instructor and student pilots due to the dual control features and seating arrangements permitting both pilots to be dropped from the airplane in such a manner that there will be the least possible obstruction to their falling freely therefrom.

Having thus described the invention, what is claimed as new is:—

1. An airplane having tandem cockpits, a false bottom in each cockpit arranged to move downwardly for discharging the occupants of the cockpits, each of said false bottoms including a seat and a control stick, and elevator and aileron control connections between the control sticks, said connections being flexible so that the opening of the bottom of either cockpit will leave the controls in the other cockpit operative.

2. In an airplane, a pilot's compartment having a bottom opening, a pilot's seat, a framework in said cockpit having a horizontal base portion forming the floor of the cockpit and an upstanding back portion forming a support for the seat, said framework being hingedly mounted to swing downward and discharge the occupant of the seat through the bottom opening of the compartment, a shaft journaled in said compartment, and having a loop engaged over said back portion of the framework for holding the latter against downward swinging movement, and means for turning the rod to disengage the loop from the said back portion.

3. Airplane controls including a control stick comprising two hollow cones placed end to end, the periphery of the lower cone fitting in a groove in the upper cone to provide a circular hinge on which the upper cone is adapted to pivot in any direction, a rod enclosed within said cones with its lower end hingedly connected to the lower cone, a spring housed within the upper cone and engaged with said rod for tensioning same, and means for adjusting the tension of said spring.

4. In an airplane fuselage, a compartment having a bottom opening, a seat pivotally mounted therein to swing downwardly to discharge the occupant through said bottom opening, a safety strap having retaining loops, pins slidably mounted on said seat and engaging in said loops, and connections between said fuselage and the said pins operating to withdraw the pins from the said loop during the downward swing of the said seat.

5. In an airplane, a cockpit having a drop bottom including a floor frame pivotally mounted to swing downwardly, releasable means for holding the floor frame in normal position, a seat mounted on said frame for movement downwardly therewith to discharge the occupant, a control stick mounted on the frame, and means operating on the downwardly swinging movement of the frame to position the stick out of the path of the falling occupant.

6. In an airplane having front and rear cockpits, a control stick in the rear cockpit, aileron control wires connected to said stick, a seat pivotally mounted in the front cockpit to swing downwardly when released to discharge the occupant therefrom, a control stick connected with said seat for movement downwardly therewith, and flexible connections between the last mentioned stick and the aileron control wires adapted in the downward position of the seat to slacken so as to not interfere with the operation of the controls from the rear cockpit.

7. In an airplane, a fuselage having a cockpit open at the bottom, an elevator control rod journaled in the fuselage crosswise of said cockpit, an occupant-supporting frame normally closing the bottom opening of the cockpit and pivotally supported on said rod to swing downwardly to discharge the occupant through the said opening, a pivotally mounted control stick on said frame, releasable means for holding the said frame in normal position, and an eccentric connection between the said stick and the said elevator control rod.

In testimony whereof I affix my signature.

WILLIAM C. OCKER.